US008015407B2

(12) United States Patent
Basquin

(10) Patent No.: US 8,015,407 B2
(45) Date of Patent: Sep. 6, 2011

(54) PRE-CONTROL OF A PROGRAM IN AN ADDITIONAL CHIP CARD OF A TERMINAL

(75) Inventor: Bruno Basquin, Marseilles (FR)

(73) Assignee: Gemalto SA, Meudon (FR)

( * ) Notice: Subject to any disclaimer, the term of this patent is extended or adjusted under 35 U.S.C. 154(b) by 1710 days.

(21) Appl. No.: 11/010,331

(22) Filed: Dec. 14, 2004

(65) Prior Publication Data
US 2005/0105731 A1    May 19, 2005

(51) Int. Cl.
*H04L 9/32* (2006.01)
*G06F 17/00* (2006.01)
*G06F 7/04* (2006.01)
*G06F 11/00* (2006.01)

(52) U.S. Cl. .................. 713/169; 726/20; 726/9; 725/2
(58) Field of Classification Search .................. 713/169; 725/2; 726/20, 9
See application file for complete search history.

(56) References Cited

U.S. PATENT DOCUMENTS

| | | | | |
|---|---|---|---|---|
| 4,709,136 A * | 11/1987 | Watanabe | ...................... | 235/379 |
| 4,752,677 A | 6/1988 | Nakano et al. | | |
| 4,752,678 A * | 6/1988 | Rikuna | .......................... | 235/380 |
| 4,786,790 A | 11/1988 | Kruse et al. | | |
| 5,365,516 A | 11/1994 | Jandrell | | |
| 5,412,726 A * | 5/1995 | Nevoux et al. | ................. | 380/249 |
| 5,418,837 A | 5/1995 | Johansson et al. | | |
| 5,495,098 A * | 2/1996 | Pailles et al. | ................... | 235/492 |
| 5,534,857 A * | 7/1996 | Laing et al. | ................... | 340/5.74 |
| 5,586,166 A | 12/1996 | Turban | | |
| 5,602,915 A * | 2/1997 | Campana et al. | ............. | 380/277 |
| 5,661,806 A | 8/1997 | Nevoux et al. | | |
| 5,763,862 A * | 6/1998 | Jachimowicz et al. | ........ | 235/380 |
| 5,774,546 A * | 6/1998 | Handelman et al. | ........... | 380/227 |
| 5,799,085 A | 8/1998 | Shona | | |
| 5,819,176 A * | 10/1998 | Rast | ........................... | 455/422.1 |
| 5,854,581 A * | 12/1998 | Mori et al. | ..................... | 235/379 |
| 5,864,757 A * | 1/1999 | Parker | .......................... | 455/418 |
| 5,884,168 A | 3/1999 | Kolev et al. | | |
| 5,907,616 A * | 5/1999 | Brogger et al. | ................ | 713/172 |
| 5,913,175 A | 6/1999 | Pinault | | |
| 5,979,773 A * | 11/1999 | Findley et al. | ................ | 235/492 |
| 6,002,605 A | 12/1999 | Iwasaki et al. | | |
| 6,002,929 A * | 12/1999 | Bishop et al. | .................. | 455/431 |
| 6,018,717 A * | 1/2000 | Lee et al. | .......................... | 705/13 |
| 6,038,551 A * | 3/2000 | Barlow et al. | .................... | 705/41 |

(Continued)

OTHER PUBLICATIONS

"Plastic Fantastic, (smartcards) (Technology Information)", Mar. 11, 1999, Computer Weekly, 43(1), Dialog file 275, Access #02279331.

*Primary Examiner* — Techane J Gergiso
(74) *Attorney, Agent, or Firm* — Buchanan, Ingersoll & Rooney PC

(57) ABSTRACT

Prior to the execution of a program contained in a second chip card inserted in a terminal such as a mobile radio telephone terminal, in addition to a first chip card containing data and connected to a telecommunication network to which the terminal is linked, one of the cards is authenticated by the other, or the two cards are authenticated mutually. This double authentication ensures the authenticity of the program for its overall execution in the terminal and the origin of the second card, distributed through conventional channels, for the network operator.

11 Claims, 5 Drawing Sheets

U.S. PATENT DOCUMENTS

| | | | |
|---|---|---|---|
| 6,052,604 A * | 4/2000 | Bishop et al. | 455/558 |
| 6,058,476 A * | 5/2000 | Matsuzaki et al. | 713/169 |
| 6,075,860 A * | 6/2000 | Ketcham | 713/159 |
| 6,178,335 B1 * | 1/2001 | Vu | 455/558 |
| 6,212,372 B1 * | 4/2001 | Julin | 455/418 |
| 6,216,014 B1 * | 4/2001 | Proust et al. | 455/558 |
| 6,223,052 B1 * | 4/2001 | Ali Vehmas et al. | 455/551 |
| 6,240,517 B1 * | 5/2001 | Nishioka | 726/20 |
| 6,298,441 B1 * | 10/2001 | Handelman et al. | 713/185 |
| 6,424,714 B1 | 7/2002 | Wasilewski et al. | |
| 6,430,409 B1 | 8/2002 | Rossmann | |
| 6,606,491 B1 | 8/2003 | Peck | |
| 6,732,272 B1 * | 5/2004 | Inoue et al. | 713/190 |
| 7,003,319 B1 * | 2/2006 | Howell et al. | 455/558 |
| 7,239,704 B1 * | 7/2007 | Maillard et al. | 380/210 |

\* cited by examiner

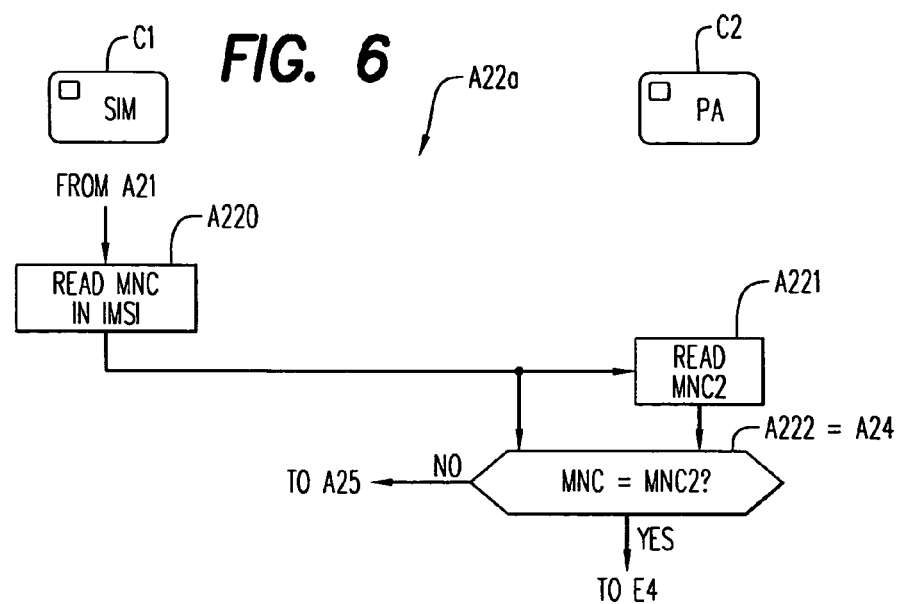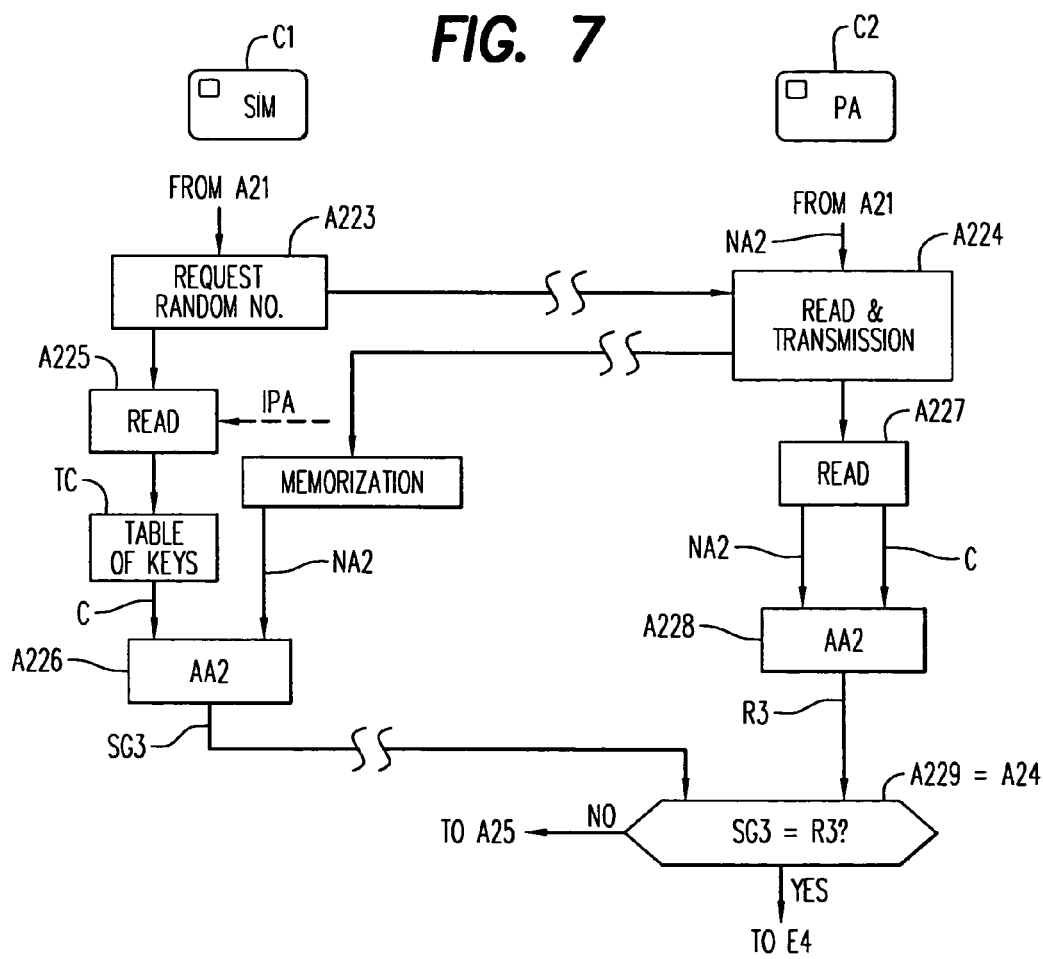

PRE-CONTROL OF A PROGRAM IN AN ADDITIONAL CHIP CARD OF A TERMINAL

This disclosure is based upon, and claims priority from, French patent application No. 99-07059, filed Jun. 3, 1999, the contents of which are incorporated herein by reference.

FIELD OF THE INVENTION

This invention relates to securing application programs furnished by means of an additional chip card that can be inserted in a telecommunication terminal. For instance, the terminal can be a mobile radio telephone terminal, with a first card for the identification of the subscriber and communications with the telecommunication network, as well as an additional chip card reader.

BACKGROUND OF THE INVENTION

In a cellular radio telephone network of the GSM type, provision is made for supplying the subscriber with application services based on the execution of application programs within SIM chip cards. These services are carried out by a standardized technology, commonly known as the SIM Application Toolkit. One particular feature, called pro-activity, makes it possible for the SIM card, while a program is being run, to address requests to the outside world: the terminal, the subscriber, and the network.

For example, such application programs comprise menus for interrogating a bank server and conducting bank transactions from the terminal at a distance. The development of value-added service applications, executed in the SIM card, requires means for the distribution and maintenance of these applications during the course of the subscription. This is possible by personalizing the SIM card with adequate programs prior to its being sent to the subscriber, or by remotely loading via radio or by loading these programs into the SIM card directly at the point of sale.

The prior technique also provides for an additional chip card which is distinct from the SIM card and which can be inserted in the terminal or which can be linked to the terminal of the SIM card by an external reader. The second card is controlled by a program that is being carried out in the SIM card. The terminal performs a transparent role by simply transmitting the commands prepared by the SIM card to the second card. This exchange of commands is intended to develop services that will involve all types of chip cards. For example, the second card is a bank card that can thus offer remote payment services on the mobile terminal.

The second card becomes a means for the distribution of applications by transporting programs performing value-added services, such as those one may find currently in the SIM card.

The introduction of the second card in the terminal entails a drawback in that the application is no longer necessarily furnished by the operator of the network and thus not subject to authenticity checks. The second card does not contain any means for certifying its content through the terminal, the first card, or the network.

SUMMARY OF THE INVENTION

The object of the invention is to reinforce security before and during the implementation of an application contained in an additional card and executable, notably by the first card of the terminal or through the terminal itself.

To this end, a process for pre-controlling the execution of a program, contained in a second chip card, inserted in a terminal, in addition to a first chip card, containing data tied to a telecommunication network to which the terminal is linked, is characterized in that it comprises an authentication of either the first or second cards by the other card prior to the execution of the program, as well as during it.

The authentication thus prevents the fraudulent use, pirating, and copying of an application program or programs in the second card.

In keeping with the basic idea behind the invention, a second chip card is any card among a plurality of additional cards, containing different application programs, at the rate of one or several programs per second card, independently of the software for communicating between the latter, the first card, and the terminal.

The plurality of second cards enables an operator to propose to his subscribers new services that are sold through a conventional distribution circuit, in the form of second cards to be inserted in the terminal, while maintaining control over the proposed services.

According to a first embodiment, when the authentication entails an authentication of the second card by the first card, it can comprise the following phases:

applying a program identifier that is transmitted through the second card to the first card and a key with an algorithm contained in the first card so as to produce a result, and, comparing the result and the certificate that is transmitted through the second card to the first card, to execute the program only when the two are equal.

The authentication can then comprise a selection of the key in a table of keys contained in a first card as a function of the program identifier.

According to a second embodiment, when the authentication comprises an authentication of the second card by the first card, it can include the following phases:

transmitting a random number from the first card to the second card;

applying the random number transmitted and a key to an algorithm contained in the second card so as to produce a signature transmitted to the first card;

applying the random number and an algorithm key, contained in the first card so as to produce a result; and comparing the result to the signature transmitted in the first card so as to execute the program only when the two are equal.

The authentication may then comprise a selection of the key in a table of keys contained in the first card as a function of a program identifier transmitted from the second card to the first card.

When the authentication comprises an authentication of the first card by the second card, it may comprise the following phases according to a first embodiment:

transmitting a predetermined field of a number from the first card to the second card;

comparing the predetermined field to a number in the second card so as to execute the program or to read its content only when the two are equal.

The predetermined field can then comprise at least the call sign of the telecommunication network contained in the identity number of the first card.

When the authentication comprises an authentication of the first card by the second card, it may comprise the following phases in accordance with a second embodiment:

reading a random number from the first card into the second card;

applying the random number and an algorithm key contained in the first card so as to produce a signature transmitted to the second card;

applying the random number and an algorithm key contained in the second card so as to produce a result; and comparing the result to the signature transmitted in the second card in order to execute the program or read its content only when the two are equal.

The authentication may then comprise a selection of the key in a table of keys contained in the first card as a function of the program identifier transmitted from the second card to the first card.

The process is more efficient when authentication is mutual between the first card and second cards. It comprises the following:

either a first authentication of the second card by the first card and a second authentication of the first card by the second card which follows the first authentication when the second card is authenticated by the first card and which is followed by the execution of the program when the first card has been authenticated by the second card; or a first authentication of the first card by the second card and a second authentication of the second card by the first card which follows the first authentication when the first card is authenticated by the second card and which is followed by the execution of the program when the second card is authenticated by the first card.

All of the first cards are not necessarily to be authenticated by a second card and, reciprocally, all of the second cards are not necessarily to be authenticated by the first cards. In particular, at least a portion of the authentication can be executed only in response to a request for authentication transmitted from the second card to the first card.

The first card cannot contain the material or software for participating in authentication. In this case, the process can comprise authentication phases executed in a telecommunication network server in response to a request from the first card. The execution of the program, be it done (at least partially) in the first card, or the terminal, or in the second card, requires a prior verification of the compatibility of these three entities. On that score, the process may comprise a reading of the characteristics for the execution of the program in the second card from the first card or the terminal in response to an introduction of the second card in a reading means linked to the terminal, and an analysis of characteristics, comparing the material and software capacities of the first card and/or the terminal to reject the second card when said characteristics are incompatible with the first card and/or the terminal.

According to a preferred embodiment, the telecommunication network is a radio telephone network, the terminal is a mobile radio telephone terminal, and the first chip card is a subscriber identity card. However, according to other variants, the telecommunication network may simply be a switched telephone network or a digital service integration network or a specialized or private data transmission telephone network.

BRIEF DESCRIPTION OF THE DRAWINGS

Other features and advantages of this invention will appear more clearly upon reading the following description of several preferred embodiments of the invention with reference to the attached corresponding drawings where:

FIG. 6 is an algorithm of a second authentication of a first card by the second card according to a first embodiment; and FIG. 7 is an algorithm of a second authentication of a first card by the second card according to a second embodiment.

DETAILED DESCRIPTION

Figure 1:
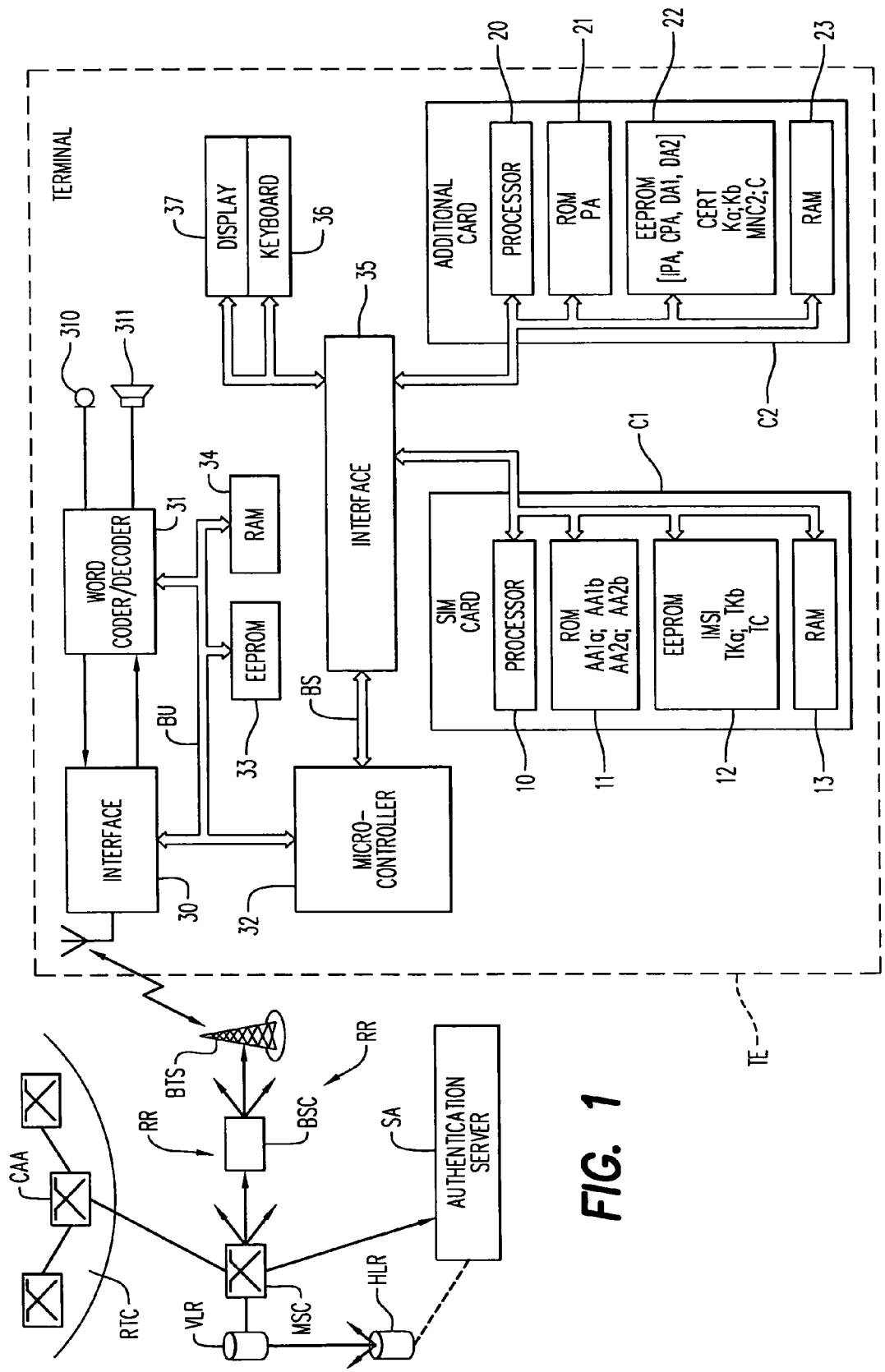
FIG. 1 is a detailed block diagram of a cellular radio telephone network with a mobile terminal.

By way of example, an embodiment of the invention will be described in the context of a telecommunication network of the digital cellular radio telephone network type RR of the GSM type, as shown in FIG. 1. A mobile radio telephone terminal TE of the radio telephone network comprises a first chip card C1, constituting a microprocessor module that can be removed from the terminal, as well as a second chip card C2, called an additional application card, either linked to the terminal TE by means of a card reader distinct from the terminal, or housed in the terminal so that it can be removed.

In FIG. 1, network RR is shown in the form of a diagram by a mobile service switch MSC for the location zone where the mobile terminal TE is at a given instant, and a base station BTS linked to the switch MSC by a base station controller BSC and to a terminal TE via radio. The entities MSC, BSC and BTS principally constitute a fixed network through which are transmitted especially messages for signaling to semaphore channels, and control, data, and voice messages. The principal entity of the RR network that is capable of interacting with the first card in the terminal TE is the mobile service switch MSC, associated with a visitor location recorder VLR and linked to at least one autonomous routing telephone switch CAA of the switched telephone network RTC. The switch MSC handles communications for mobile visitor terminals, including the terminal TE, located at any given instant in the location zone serviced by the switch MSC. The base station control BSC in particular handles the allocation of channels to the mobile visitor terminals, and the base station BTS covers the radio communication cell where the terminal MS happens to be at a given instant.

The radio telephone network RR also comprises a nominal location recorder HLR, linked to the recorders VLR and similar to a database. The recorder HLR contains, for each radio telephone terminal especially the international identity (IMSI) (International Mobile Subscriber Identity) of the first chip card C1, called the SIM card (Subscriber Identity Module) included in the terminal TE, that is to say, the identity of the subscriber who is the owner of the SIM card, the subscription profile of the subscriber, and the number of recorder VLR to which the mobile terminal is temporarily attached.

The terminal TE shown in detail in FIG. 1, comprises a radio interface 30 with the radio telephone network RR, comprising primarily a transmission and reception channel duplexer, frequency transposition circuits, analog-digital and digital-analog converters, a modulator and demodulator, and a channel coding and decoding circuit. Terminal TE also comprises a word coding and decoding circuit 31, linked to a microphone 310 and a loudspeaker 311, a microcontroller 32, associated with a nonvolatile program memory EEPROM 33 and a data memory RAM 34, and an input-output interface 35, servicing chip cards C1 and C2, a keyboard 36, and a graphic display 37. Microcontroller 32 is linked by a bus BU to interface 30 to circuit 31, and to memories 33 and 34 and, by another bus BS, to the input-output interface 35. Microcontroller 32 handles all base band data processing that the terminal receives and transmits after frequency transposition, particularly relating to protocol layers 1, 2, and 3 of the ISO model and supervises exchanges of data between the network RR through radio interface 30 and first chip card C1 through input-output interface 35.

The SIM chip card C1 is linked to the input-output interface 35, including at least one card reader in the terminal and the peripheral connectors of the mobile terminal. Chip card C1 mainly contains a microprocessor 10, a memory 11 of the ROM type, including a card processing system and specific algorithms for communication, application, and authentication according to the invention, a nonvolatile memory 12 of the EEPROM type, which contains all of the characteristics tied to the subscriber, in particular, the international subscriber identity IMSI, and a RAM-type memory 13, intended essentially for the processing of data to be received from microcontroller 32, included in the terminal, and the second card C2, and to be transmitted to them.

As shown in FIG. 1, an authentication server SA is optionally provided as an internal radio telephone network RR entity and is linked to one or several couples of mobile service switches MSC and visitor location recorder VLR through the signaling network of network RR. The address of the server SA is pre-stored in memory 12 of card C1.

Figure 2:
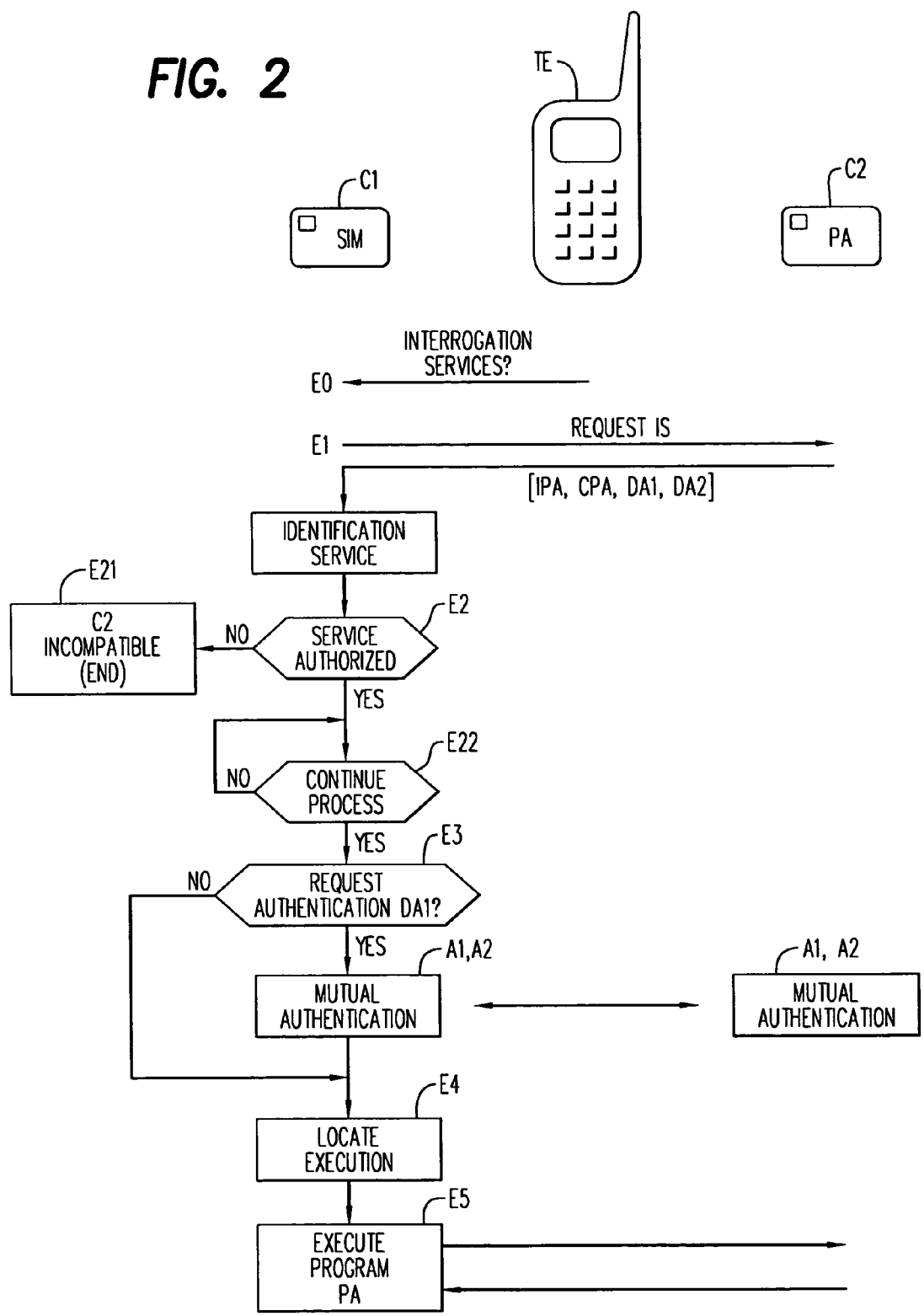
FIG. 2 is an algorithm of principal phases of the pre-control procedure for execution of the program according to the invention.

According to the invention, several software units are primarily remotely loaded into memories ROM 11 and EEPROM 12 to handle applications in additional cards C2. In particular, the algorithm of the pre-control procedure according to the invention, shown in FIG. 2, is implemented in memories 11 and 12.

Just like SIM card C1, the second card C2 also comprises a microprocessor 20, and ROM memory 21, including a system for the processing of card C2 and, at least partially, an application program PA and a specific authentication algorithm according to the invention, a nonvolatile type EEPROM memory 22, containing, according to the invention, an identifier IPA of the application program as well as characteristics CPA, required for the execution of the program, plus one or two authentication requests DA1 and DA2, and RAM 23 memory that processes the data to be received from microcontroller 32 and from processor 10. Card C2, for example, can be a bank card, an electronic money card, a game card, or a business card; in the last case, the business card is intended to insert the name and telephone number of the person who sent the card in the telephone directory of the SIM card and/or to call said person automatically.

The ROM and EEPROM memories 11, 12, 21 and 22, in cards C1 and C2, comprise communication software for conducting a dialog, on the one hand, with microcontroller 32 of terminal TE, and, on the other hand, between processors 10 and 20 through terminal TE, that is to say, through microcontroller 32 and input-output interface 35.

To conduct a dialog between themselves, the SIM card C1 and additional card C2 are of the proactive type so as to trigger actions in the mobile terminal MS by means of pre-formatted commands according to the "T=0" protocol of ISO 7816-3 and encapsulated according to recommendation GSM 11.14 (SIM Toolkit). This recommendation permits an extension of the set of commands of the operating system, included in the memory 11, 21 of chip card C1, C2, to make available—to the other card C2, C1—data transmitted through chip card C1, C2. As described hereinafter, terminal TE can be transparent to certain exchanges of data between cards C1 and C2, or it can communicate with one of the cards without communicating with the other card.

As shown in FIG. 2, the pre-control procedure for the execution of an application program PA, contained in the second card C2, comprises four principal phases E1 to E4. Initially, the pre-control procedure is triggered in a phase E0 either manually, by pushing a predetermined validation button on the keyboard of terminal TE or by validating a guideline "VALIDATE INSERTION OF ADDITIONAL CARD," displayed on the screen of the terminal after card C2 has been inserted in the reader, or automatically, via terminal TE, in response to a card presence message, transmitted by the distinct reader of terminal TE or integrated in the input-output interface 35, as in the case of card C1. Terminal TE then invites the first card C1, the SIM card, to interrogate the second card C2.

According to the embodiment illustrated in FIG. 2, everything takes place during subsequent phases E1 to E4, as if terminal TE—in fact, the microcontroller 32 and the input-output interface 35—were to be transparent to data exchanged between the two cards.

In the next phase E1, card C1 reads and stores in memory EEPROM 12, service information items IS in memory EEPROM 22 of card C2 through terminal TE. The service information items contain the identifier IPA of the application program PA, the characteristics CPA, required for the execution of the program, and, quite often, an authentication request DA. The characteristics CPA are especially a type of software environment, a memory capacity, and material parameters of the terminal TE, necessary for the execution of program PA as well as an execution interdiction or authorization for the program PA outside the second card CA. Due to the information items IS read in the second card C2, the first card C1 thus is informed of the nature of the application corresponding to the application program contained in the second card.

If, in the following phase E2, the first card C1 finds an incompatibility between terminal TE—including the SIM card C1—and the application program characteristics CPA, then card C1 refuses to continue the pre-control procedure to a phase E21, and reports a rejection to terminal TE so that it may display a message "ADDITIONAL CARD INCOMPATIBLE."

In the opposite case, card C1 decides to continue or not to continue the pre-control procedure to an intermediate phase E22. If card C1 does not immediately continue the pre-control procedure, for example, on account of a call from the terminal, then card C1 postpones the pre-control in order later on to recover the program PA or have it executed in card C2.

If, after phase E22, the first card C1 continues the pre-control procedure, it verifies—in the application program characteristics CPA read in card C2—that an authentication by means of one of the cards is required through the second card C2 in phase E3.

In the absence of an authentication request, the pre-control procedure runs from phase E3 to phase E4, involving a decision as to the place where application program PA is to be executed. The place of program execution is chosen among the three entities that are the first card C1, called the SIM card, the second card C2, called the additional card, and the terminal TE, using the proactive Toolkit application commands of the SIM card with the terminal.

According to a first variant, application program PA is remotely loaded from the second card C2 into the first card C1 through the software of the multiple cardreader for the Toolkit application, so that the application program PA may be executed in card C in the next phase E5.

According to a second variant, the program PA is executed in the second card C2 in phase E5. According to a first option, the program PA is launched in response to a command from the SIM card C1, which then leaves the initiative of exchanges of commands and responses, for the execution of the program, to terminal TE which communicates directly with the second card. According to a second option, the program PA is launched on the command of the SIM card C1 and all of the exchanges of commands and responses are carried out between card C2 and terminal TE through card C1 which creates the illusion, in the terminal, of containing and executing the program PA itself.

According to a third variant, the program PA is remotely loaded from the second card C2 into terminal TE and is executed in phase E5 in an execution software environment, implemented initially for this purpose in the terminal.

After phase E4, the program PA, read in card C2, is executed in phase E5. This program supplies the subscriber with a service, for example, by indicating text menus on display 37, acquisition of subscriber data through the SIM card C1, dispatch of requests to the RR network or the RTC, and interpretation of responses to requests.

According to another embodiment, the operations performed in the SIM card C1, during phases E1 to E4, and shown to the left in FIG. 2, with the exception of those pertaining to mutual authentication described in detail below, are executed in terminal TE, that is to say, under the command of microcontroller 32. The terminal thus reads the service information items IS [IPA, CPA, DA] in Phase E1 and itself decides to continue the pre-control procedure for program execution in phases E2, E3, and E4.

Figure 3:
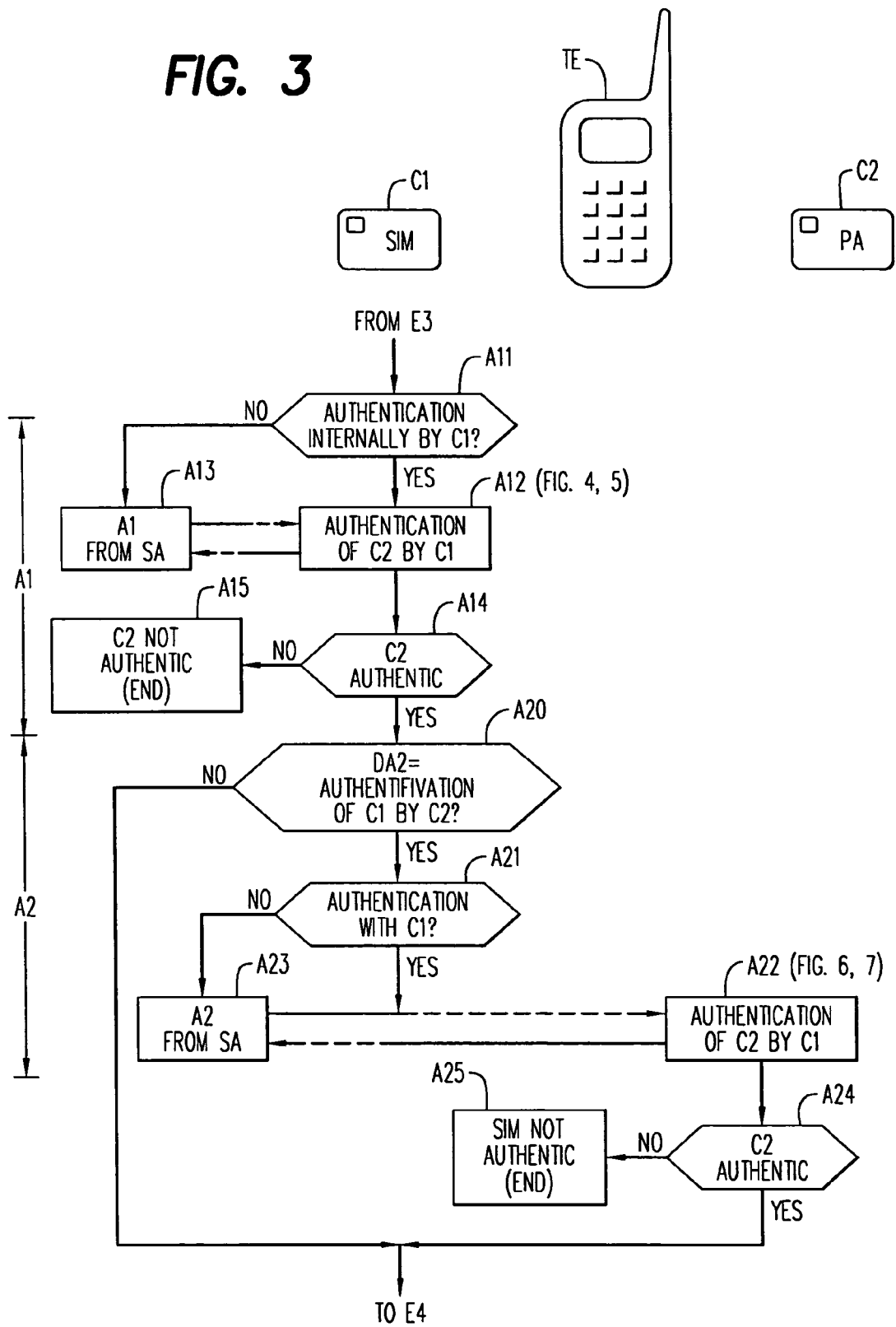
FIG. 3 is a mutual authentication algorithm of a first card and a second card, both of which are linked to the terminal.

Going back now to phase E3 in FIG. 2, the first card C1 triggers a mutual authentication of cards when an authentication request DA1 is contained in the service information items IS, read in card C2, and stored in card C1. According to the embodiment illustrated in FIG. 3, mutual authentication comprises a first authentication A1 of the second card C2 by the first card C1, then, in response to the authenticity of the second card, a second authentication A2 of the first card C1 by the second card C2. However, according to another embodiment of the invention, the order of authentications is reversed: authentication A2 of card C1 by card C2 is performed first, then, in response to the authenticity of the first card, comes authentication A1 of card C2 by card C1.

The first authentication A1 makes sure that an application program, contained in an additional card, such as card C2, can be executed only when that program is duly certified. Authentication A1 comprises phases A11 to A15, illustrated in FIG. 3.

During phase A11—following phase E3—the first card C1, the SIM card verifies that it contains a first authentication algorithm AA1, handled and written in memories ROM 11 and EEPROM 12. In the affirmative, card C1 proceeds to the authentication of card C2 in phase A12. If card C2 cannot be authenticated by card C1 during phase A11, then SIM card C1 transmits—via terminal TE—a message asking for a first authentication from authentication server SA, connected to visitor location recorder VLR, to which is temporarily attached terminal TE, through fixed network BTS-BSC-MSC; server SA proceeds directly to the authentication of card C2, instead and in place of card C1, according to one of the two first authentications described below, by way of example. In the last phase A14 of the first authentication A1 by card C1 or server SA, mutual authentication is continued through the second authentication A2 if card C2 is authenticated; if not, mutual authentication is stopped and the control procedure is terminated in phase A15, while the SIM card transfers to the terminal TE the message "ADDITIONAL CARD NOT AUTHENTICATED" in order then to display it temporarily on display 37.

Figure 4:
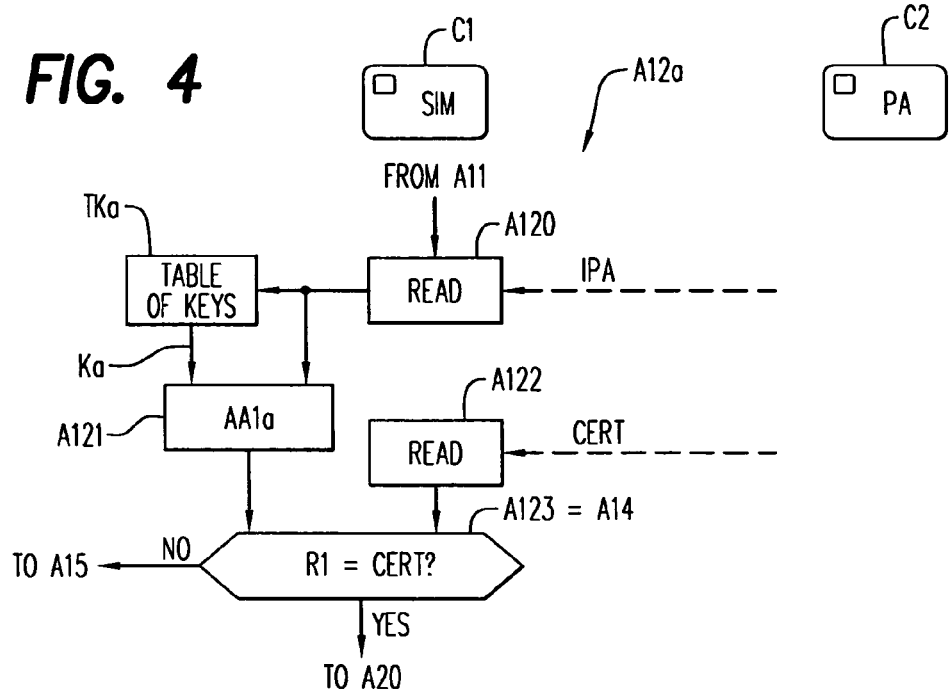
FIG. 4 is an algorithm of a first authentication of the second card by the first card according to a first embodiment.

According to a first embodiment, shown in FIG. 4, a first authentication A12a of card C2 in card C1 (or in server SA) involves validating a second card certificate CERT, transmitted beforehand in the service information items IS by card C2 to card C1 during phase E1 essentially comprising four phases A120 to A124.

During the first phase A120, the application program identifier IPA of application program PA is read into memory EEPROM 12 of card C1. The identifier IPA serves as a reading address in a table of secret keys TKa, contained in memory 12, for the purpose of reading there a secret key Ka corresponding to program PA or to a family of programs, comprising program PA. The identifier IPA and key Ka are applied to an authentication algorithm AA1a which produces a result R1 in phase A121. The algorithm AA1a, for example, is of the DES (Data Encryption Standard) type, as the other authentication algorithms cited in the description further on. The certificate CERT is read into card C1 in phase A122 to be compared to the result R1 in phase A123, equivalent to phase A14: if R1=CERT, then certificate CERT is certified and card C2 is authenticated by card C1, while the authentication of card C1 is executed in phase A2; if not, the authentication and pre-control process is stopped in phase A15.

Figure 5:
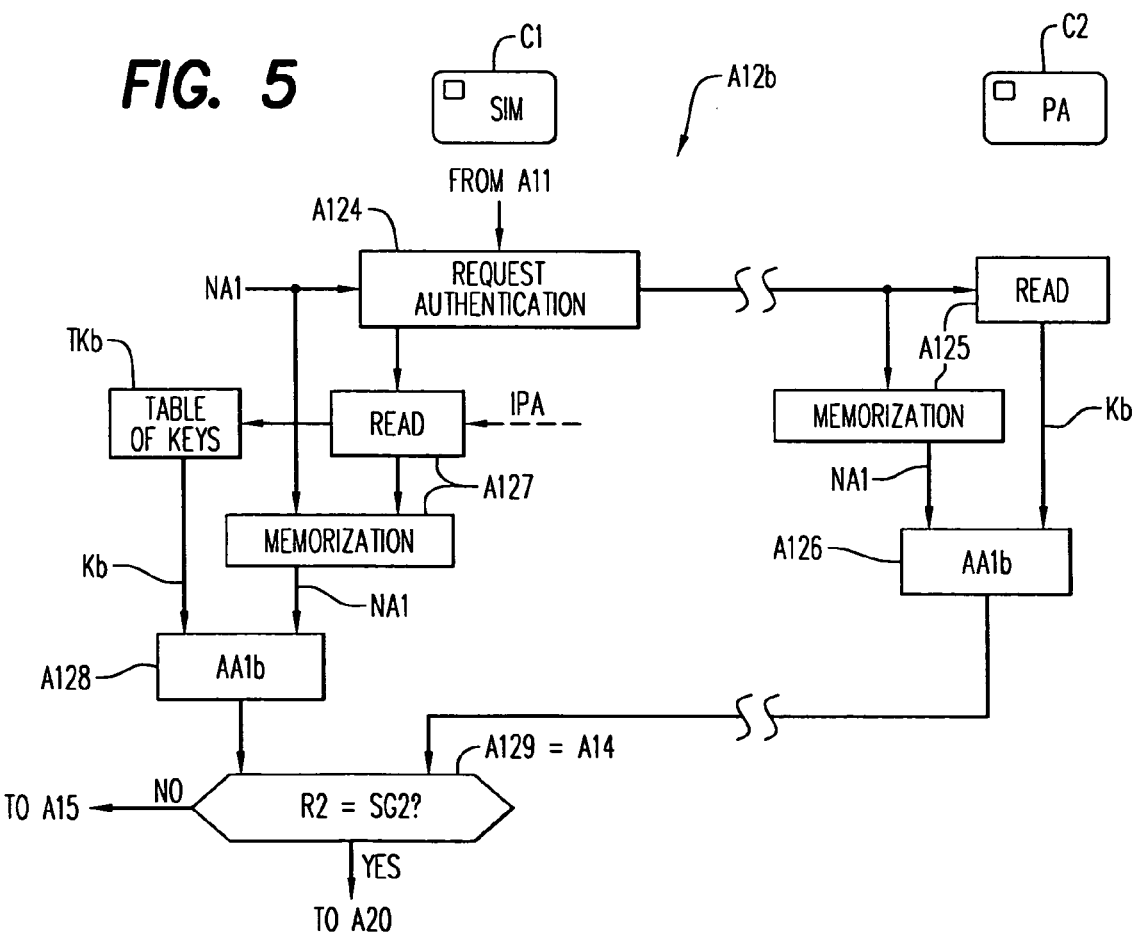
FIG. 5 is an algorithm of a first authentication of the second card by the first card according to a second embodiment.

Another first authentication A12b of card C2 in card C1 is shown in FIG. 5. It comprises phases A124 to A129 and consists of validating, through card C1, the result SG of a calculation performed in the second card C2 as a function of a random number NA, transmitted by the first card C1.

Following phase A11, card C1 selects a pseudo-random number NA1, supplied by a pseudo-random generator that processor 10 contains for the purpose of introducing it into an authentication request message transmitted to card C2 through terminal TE in phase A124. In response to the authentication request, the second card C2 temporarily stores the transmitted random number NA1 in memory 23 and reads a secret key Kb in memory EEPROM 22 in phase A125. In phase A126, random number NA1 and key Kb are applied to an authentication algorithm AA1b which produces a signature SG2.

Almost simultaneously with phases A125 and A126, analogous phases A127 and A128 are made in first card C1. In phase A127, following the preparation of the authentication request message, random number NA1 is written into memory RAM 13 of card C1 and identifier IPA is read into memory EEPROM 12 of card C1 in order to address by reading a table of secret keys Kb in memory EEPROM 12. Then, in phase A128, random number NA1, read into memory 13, and key Kb read into table TKb, are applied to algorithm AA1b also implemented in memories ROM 11 and EEPROM 12 of card C1. A result R2 is produced through algorithm AA1b in card C1.

Finally, in phase A129, the second card C2 transmits the signature SG2 to the first card C1 through terminal TE to compare it to result R2. Phase A129, equivalent to phase A14, authenticates card C2 in card C1 if R2=SG2, so as to execute phase A20, or it rejects card C2 when R2 is different from SG2 and phase E15 stops the authentication and pre-control procedure.

In either of the first authentications, prior to phase A120, A124, secret keys Ka, Kb are loaded into memory EEPROM 12 of SIM card C1 during the initial personalization of card C1 at the time the user-owner of the card subscribes, or they are remotely loaded while using card C1, for example, if they are modified or supplemented.

A third way to perform the first authentication involves transmitting the following in phase E1, from the second card to the first card: an application program identifier IPA, a second card identifier, typically the serial number CSN for card serial number, in English, and a number RND as a function of the IPA and the CSN. If the first card already contains an authorization for the triplet IPA, CSN, RDN, then authentication has been accomplished successfully. On the other hand, if the first card does not yet have an authorization for this triplet, it contacts an authorization center by means of a secure channel and transmits to that authorization center the triplet IPA, CSN, RDN, as well as a unique number associated with the first card, such as its CSN, or the IMSI.

The authorization center verifies that the triplet IPA, CSN, RDN corresponds to an authorized card in its data base. If this is not the case, the authorization center transmits to the first card a message indicating that the second card is not authorized. If the triplet corresponds to a second authorized card, the authorization center verifies in a database that the second card is not yet associated with another "first" card. If this is the case, the authorization center sends to the first card a message indicating that the authentication has failed. If the second card was not yet associated with a first card, the authorization center modifies the database so as to associate the second card with the first card, then the authorization center sends to the first card a message indicating that authentication was successful. The first card then stores the authorization to prevent re-contacting the authorization center during a later authentication phase.

In this third mode of implementation of the first authentication, one could, optionally, associate a second card no longer to only one first card but to a group of first cards, so as to permit the use of one and the same second card by a small group of users.

Returning to FIG. 3, the second authentication A2 has commenced if, in phase A14, the equality R1=CERT, according to authentication A12a or the equality RES1=SG, according to authentication A12b is satisfied. Authentication A2 makes sure that the first card C1, the SIM card is duly enabled by the second card C2 to trigger and read application program PA in card C2.

The second authentication A2 starts with a prior verification of the need for the latter during a phase A20 looking in the service information items IS, in memory 12, for the presence of a second authentication request DA2. If authentication A2 has not been executed due to the absence of authentication request DA2, then the pre-control procedure moves on directly to the determination of the precise place of execution of application program E4. In the alternative, phases A21 to A25 of the second authentication are executed, respectively, in a manner similar to phases A11 to A15 of the first authentication A1.

In phase A21, following phase A20, card C1 verifies that it is capable of participating in the second authentication properly speaking. If it is not capable, card C1 sends, through terminal TE, a message requesting second authentication of authentication server SA which participates in phase A23, in the second authentication, instead of and in place of card C1, as described below in detail in phase A22. At the end of A24 of phase A22 or A23 of the authentication of card C1 with the participation of card C1 or server SA through card C2, card C1 is either authenticated and the pre-control procedure moves on to the phase determining the place of execution E4, or it is not authenticated, and the pre-control procedure is terminated in phase A25 through the presentation of a message "SIM CARD NOT AUTHORIZED" on display 37 of terminal TE.

According to a first embodiment shown in FIG. 6, the second authentication A22a comprises phases A220 to A222 and consists of a transmission of a predetermined field of the international identity number IMSI (International Mobile Subscriber Identity) of the subscriber who owns the SIM card C1 to the second card C2 and a comparison of the transmitted field to the number previously stored in card C2.

In a phase A220, the field that was predetermined in the identity number IMSI, contained in memory 12 of card C1 is read. The predetermined field, for example, is the call sign MNC (Mobile Network Code) with two digits, of the radio telephone network RR, to which the subscriber is connected, or the entire call sign, MNC and the call sign of the country MCC (Mobile Country Code) to which the network RR belongs, so that card C2, generally issued through the operator of network RR, will verify that the SIM card does indeed belong to the operator. According to another variant, the predetermined field is a prefix of the subscriber number MSIN (Mobile Subscriber Identification Number) that is common to a group of subscribers.

In response to the predetermined field, for example, the call sign MNC, in card C2, an equivalent number MNC2 is read into memory 22, in phase A221. The following phase A222, equivalent to phase A24, compares the numbers MNC and MNC2 and directs the pre-control procedure to phase E4 when they are equal; otherwise, the authenticity of card C1 is not recognized by card C2 which invites terminal TE directly or via the SIM card C1, to display the message of phase A25 and the pre-control procedure is stopped.

According to a second embodiment, shown in FIG. 7, the second authentication A22b comprises phases A223 to A229 and involves validating, by card C2, the result SG3 of a calculation performed in the first card C1, as a function of a random number NA2, requested of card C2 by card C1.

Following phase A21, card C1 sends a message requesting a random number to card C2 via terminal TE in phase A223. Card C1 in its memory EEPROM 22 reads a random number NA2 finished by the processor 20 which it transmits via terminal TE to card C1 that temporarily stores it in phase A224. In card C1, the random number request phase is followed up by a reading A225 of the application program identifier IPA in memory EEPROM 12. The identifier is used to address, through reading, the table of secret keys TC in order to read there a key C corresponding to application program PA, or to a family of programs, comprising program PA. The random number NA2 that is received and the key C that is read are then applied to a second authentication algorithm AA2 in card C1, furnishing a signature SG3 in phase A226, which signature is transmitted to card C2 via terminal TE.

After the random number selection phase A224, in card C2, the key C in memory 22 is read with the random number NA2 in a phase A227 in order to apply them to the algorithm AA2 that is also implemented in memories 21 and 22 in card C2. Algorithm AA2 produces a result R3 in phase A228. The signature SG3, received through card C2, is compared to the result R3 in phase A229 which is equivalent to phase A24. Card C1 is authenticated by card C2 when SG3=R3 and the pre-control procedure moves on to phase E4. If not, when SG3≠R3, card C2 rejects card C1 in phase A25 and the SIM card asks terminal TE to display the message "SIM CARD NOT AUTHORIZED" and the pre-control procedure is terminated.

Generally speaking, if the authentication of card C1 by card C2 fails, then all or a portion of the programs contained in card C2 remain illegible and cannot be executed.

According to another embodiment of the invention, there is mutual authentication of two cards prior to the execution of the program of the second card, followed by authentication throughout the entire program execution session. At first, each of the cards generates a random number that it transmits to the other card. On the basis of the two random numbers, each card calculates a key called the session key. Each card applies an enciphering algorithm, using the session key for a known message, such as the two random numbers, and gets an enciphered message. Each card transmits its enciphered message to the other card and verifies the authenticity of the enciphered message received from the other card.

The execution of the program may be continued when the two cards have mutually authenticated each other. Throughout the entire program execution session, all messages transmitted from one card to the others are authenticated in the following manner: an algorithm is applied to the message to be transmitted so as to get a printout of said message. A signature algorithm, using the session key, is applied to the printout so as to get a signature that will be transmitted with the message to which it corresponds. When a card receives from another card a message with its signature, it recalculates a printout and a signature corresponding to the received message and verifies that this signature is identical to the one received with the message.

The invention claimed is:

1. A process for executing an application program contained within a card in a mobile telecommunication terminal, said terminal comprising a first card, and a second card containing the application program to be executed, said method comprising the steps of:
transmitting, from said second card to said first card, information pertaining to the application program to be executed;
authenticating said second card via said first card, based upon said transmitted information; and
executing said application program contained within the second card if the authentication is successful
wherein the first card contains a subscriber identification module and communication information.

2. The process of claim 1, wherein said authenticating step is performed, at least in part, by a server remote from said terminal, in response to a request from said first card.

3. The process of claim 1, further including the step of authenticating said first card by said second card, prior to executing said application program.

4. The process of claim 1, wherein said transmitted information includes an identifier of the application program.

5. The process of claim 1, wherein said transmitted information includes characteristics required for the execution of the application program.

6. The process of claim 1, wherein said authenticating step comprises:
using the information pertaining to the application program to be executed to select a key;
processing a data value in accordance with said key; and
comparing the processed data value with a value received from said second card.

7. The process of claim 6, wherein said data value comprises said information pertaining to the application program.

8. The process of claim 6 wherein said data value comprises a random number, and the value received from said second card is a signature generated from said random number by said second card.

9. The process of claim 1, wherein said step of executing said application program is carried out by either the first card or the second card or the mobile telecommunication terminal.

10. A mobile communications terminal, comprising:
a first card for executing an application program contained within another card, said first card containing a subscriber identification module and communication information; and
a second card, said second card containing the application program to be executed, wherein said first card comprises:
means for receiving, from said second card, information pertaining to the application program to be executed;
means for authenticating said second card, based upon said transmitted information; and
means for executing said application program contained within the second card if the authentication is successful.

11. A first card for executing an application program contained within a second card, the second card containing the application program to be executed, the first card comprising:
means for receiving, from the second card, information pertaining to the application program to be executed;
means for authenticating the second card, based upon the information pertaining to the application program to be executed; and
means for authorizing an execution of said application program contained within the second card if the authentication is successful
wherein the first card contains a subscriber identification module and communication information.

* * * * *